No. 755,854. PATENTED MAR. 29, 1904.
H. H. J. DIECKHOFF.
FLOATING DOCK.
APPLICATION FILED APR. 13, 1901.
NO MODEL.

WITNESSES
H. M. Kuehne
John A. Percival

INVENTOR
Hans Hugo Julius Dieckhoff
BY
ATTORNEYS

No. 755,854. Patented March 29, 1904.

UNITED STATES PATENT OFFICE.

HANS HUGO JULIUS DIECKHOFF, OF HAMBURG, GERMANY.

FLOATING DOCK.

SPECIFICATION forming part of Letters Patent No. 755,854, dated March 29, 1904.

Application filed April 13, 1901. Serial No. 55,751. (No model.)

*To all whom it may concern:*

Be it known that I, HANS HUGO JULIUS DIECKHOFF, a subject of the King of Prussia, German Emperor, residing at Hamburg, Germany, have invented certain new and useful Improvements in Floating Docks, of which the following is a specification.

In the case of floating docks as heretofore constructed the work required to raise the loaded dock consists in pumping out two quantities of water, of which the one corresponds to the weight of the ship and the other to the displacement of the portion of the dock to be raised. These two quantities of water are more or less equal, according to circumstances. Now in the case of a floating dock according to this invention the work required to raise the dock when the dock is fully loaded is reduced by about a half, according to the load, and when the dock is not loaded by about ninety-five per cent., such reduction of work being effected by suitably dividing the body of the dock, so that a quantity of water corresponding to the portion of the dock to be raised can be automatically discharged.

A floating dock in accordance with this invention is shown diagrammatically in the accompanying drawings, in which—

Figure 1:
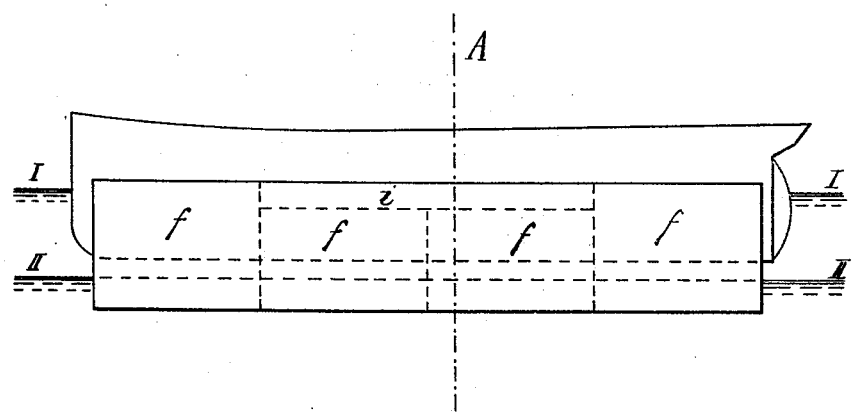
Figure 2:
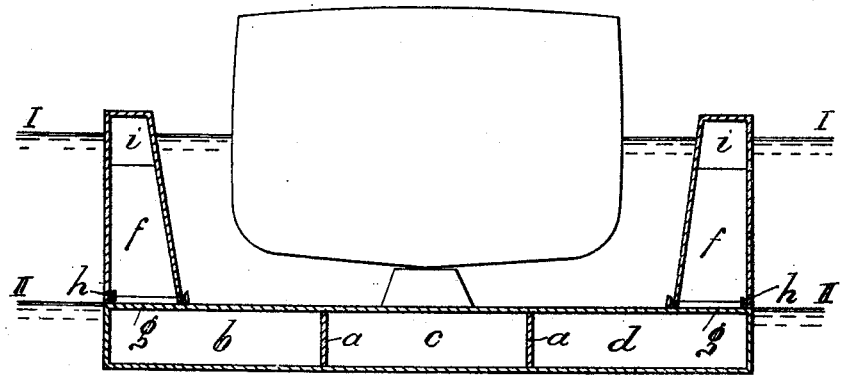

Figure 1 is a side elevation, and Fig. 2 a section corresponding to the line A B of Fig. 1.

The dock, as usual, comprises a pontoon and side chambers. The pontoon is divided by water-tight bulkheads $a$ into compartments $b$, $c$, and $d$, of which the middle compartment, $c$, constitutes an air-chamber. The side chambers $f$ are, moreover, separated from the pontoon by water-tight docks $g$ and are provided in their lowest portions with valves $h$, which are moved either automatically or by hand to establish communication between the interior of the side chambers and the surrounding water. In the upper parts of the side chambers and separated from the remainder thereof in a water-tight manner there are located chambers $i$, which serve both to contain the machinery and for storage. Now the air-chamber $c$ of the pontoon is of such dimensions that in conjunction with the parts of the chambers $i$ lying below the water-level I I it is able to support the weight of the dock. The object of relegating a portion of the air-space to $i$ is, on the one hand, to enable the empty dock to be immersed and, on the other hand, to prevent the dock from sinking below the surface I I.

To immerse the dock, water is allowed to flow into the chambers $b$ and $d$, so that the dock sinks gradually; but the side chambers $f$ also become automatically filled with water through the opening of the valves $h$. The dock is immersed to the level I I. When it is so immersed, the compartments $b$ and $d$ are completely filled with water and the chambers $f$ up to the external water-level, except as regards the chambers $i$, which, together with the chamber $c$, contain air. To raise the dock with or without a load, water is pumped out of the compartments $b$ and $d$, the valves $h$ being opened, and the water runs automatically out of the side chambers $f$ during the raising of the dock. It is easy to compensate for any list that may occur during the immersion or the raising by suitably operating the valve. When the dock has been raised to the level II II, the side chambers $f$ are completely empty, and the chambers $b$ and $d$ are pumped out sufficiently to enable the air-spaces produced in conjunction with the air-chamber $c$ to carry the weight of the dock and the load thereon. When the dock is empty, the air-spaces formed in the compartments $b$ and $d$ by pumping will therefore be as large as the portions of the chambers $i$ lying below the surface I I.

It is obvious that in the case of this dock, in consequence of the greatly-reduced quantities of water and the pumping work, the pumping machinery requires to be only half as large as has hitherto been the case, so that in addition to the saving in working expenses the initial cost in connection with such a dock is considerably less.

I claim—

In combination in a floating dock, a pontoon, side chambers, air-chambers in the pontoon, and other air-chambers in the upper part of the side chambers, and a water-compartment from which the water may be pumped, substantially as described.

Signed at Hamburg, Germany, this 3d day of April, A. D. 1901.

HANS HUGO JULIUS DIECKHOFF.

Witnesses:
MAX FOUGUET,
FRANZ STEFFENS.